United States Patent [19]
Bunyea et al.

[11] Patent Number: 5,663,011
[45] Date of Patent: Sep. 2, 1997

[54] BATTERY PACK RETAINING LATCH FOR CORDLESS DEVICE

[75] Inventors: Roderick F. Bunyea, Westminster; Alfred H. Judge, Millersville; Alvydas P. Karasa, Fallston; Philip T. Miller, Lutherville; Allen P. Smith; Thomas J. Wheeler, both of Baltimore, all of Md.

[73] Assignee: Black & Decker Inc., Newark, Del.

[21] Appl. No.: 479,586

[22] Filed: Jul. 27, 1995

Related U.S. Application Data

[63] Continuation-in-part of Ser. No. 289,158, Aug. 11, 1994, abandoned.

[51] Int. Cl.$^6$ .................................................. H01M 2/10
[52] U.S. Cl. ........................ 429/97; 429/123; 292/341.15; 30/500
[58] Field of Search .................... 429/97, 99, 123; 292/341.15; 30/500

[56] References Cited

U.S. PATENT DOCUMENTS

| | | | |
|---|---|---|---|
| 3,999,110 | 12/1976 | Ramstrom et al. | 292/341.15 X |
| 4,146,682 | 3/1979 | Nakao | 429/97 |
| 4,389,930 | 6/1983 | Rutschilling | 292/341.15 X |
| 4,628,242 | 12/1986 | Scholefield | 429/97 X |

*Primary Examiner*—Stephen Kalafut
*Attorney, Agent, or Firm*—Dennis A. Dearing; John D. Del Ponti; Bruce S. Shapiro

[57] ABSTRACT

A battery retention latch (350) comprises a retaining member (354), a release button (356) and a cam element (362). A biasing member 358 maintains the retention catch in a normally engaged position. The cam element (362) retains a battery pack (26) in a cordless device (352) regardless of the annular orientation of the battery pack (26) about a casing axis. A holding device (382, 394) maintains the battery (26) in the cavity (34) against a spring ejecting force such that the battery (26) partially extends from the device (352) enabling the battery (26) to be removed from the device (352).

30 Claims, 10 Drawing Sheets

BATTERY PACK RETAINING LATCH FOR CORDLESS DEVICE

This application is a continuation-in-part of U.S. patent application Ser. No. 08/289,158, filed Aug. 11, 1994, entitled Battery Pack Retaining Latch for Cordless Device, now abandoned, the specification and drawings of which are expressly incorporated by reference.

FIELD OF THE INVENTION

The invention relates to cordless (i.e. battery operated) devices such as portable electronic devices, toys, power tools or kitchen appliances. More particularly, the present invention relates to a battery pack latching ring to retain the pack in the device.

BACKGROUND OF THE INVENTION

For the consumer market, most cordless devices have a battery pack made integrally in the device housing because of reduced cost, increased user convenience and sturdiness. However, because of the desire to provide consumer devices with detachable packs, simplifying the recycling of the packs, and the desire to provide a family of cordless devices using an interchangeable pack and a single charger, there is a desire to use such a battery pack. Also, it is desirable to retain the battery pack in the device such that the battery pack may be easily coupled with the device and readily removable from the device. Of course, these design goals are not unique to consumer devices, but are equally desirable for professional cordless devices in which detachable packs have been standard for many years.

SUMMARY OF THE INVENTION

Accordingly, it is an object of the present invention to provide an improved battery pack latch to retain the pack in a cordless device and a battery ejecting device embodying the foregoing design objectives.

In accordance with one aspect of the invention, a battery pack retention latch comprises a retaining member to couple with the battery to retain it in the device, a release button formed with the retaining member, the release button is activated to move the retaining member to a release position to enable the battery to be removed from the device, and a spring member to bias the retaining member between its coupling or retention position and its release position. The spring member is coupled with the retaining member. Preferably, the retaining member is L-shaped with the release button positioned at the free end of the vertical leg, a cam element at the free end of the horizontal leg, and the spring positioned in a cut-out in the horizontal leg below the vertical leg. Also, the spring member is a helical spring in the cut-out to bias the retaining member in a normally engaged position in the device. The cam element has a cam face and an opposing retaining face to engage the battery.

In accordance with a second aspect of the invention, a cordless device comprises a cavity with a receptacle in the cavity, a battery pack removably located in the cavity with the battery pack including a mechanism for electrically coupling with the receptacle and the device including a retention latch in accordance with the first aspect of the invention described above.

In accordance with a third aspect of the invention, a cordless device comprises a cavity with a receptacle in the cavity, the receptacle is adapted to receive a battery, a spring member is positioned in the cavity to eject the battery, a holding member is in the cavity to maintain the battery in the cavity against the ejecting force of the spring member and the device includes a retention latch in accordance with either the first aspect of the invention described above or as disclosed herein.

The latch retains the battery pack in the cavity such that upon release of the latch, the battery pack is partially ejected from the cavity by the ejecting force of the spring member and is held in the cavity by the holding member.

The holding member includes two embodiments. First, an annular member with at least one finger with a detent holds the battery in the cavity against the ejecting force. Second, the holding member is coupled with the receptacle and includes a plurality of spaced fingers to retain the battery against the ejecting force of the spring. Also, the holding member is axially slidable in the cavity.

Additional objects and advantages of the invention will be apparent from the detailed description of the preferred embodiment, the appended claims and the accompanying drawings or may be learned by practice of the invention.

BRIEF DESCRIPTION OF THE DRAWINGS

The accompanying drawings, which are incorporated in and constitute a part of the specification, illustrate two embodiments of the present invention and together, with the description, serve to explain the principles of the invention. In the drawings, the same reference numerals indicate the same parts.

DETAILED DESCRIPTION OF THE PREFERRED EMBODIMENT

The preferred embodiment of the present invention is a cordless (i.e. battery operated) device, such as a portable electronic device, toy, kitchen appliance or power tool. Examples of such a device are a cordless screw driver 20 and drill 120 as shown in FIGS. 1, 2 and 8, 9, respectively. The preferred embodiment, more particularly, is an improved retention latch 50, 140 to retain battery packs 26 in the device 20, 120.

Figures 1, 2:
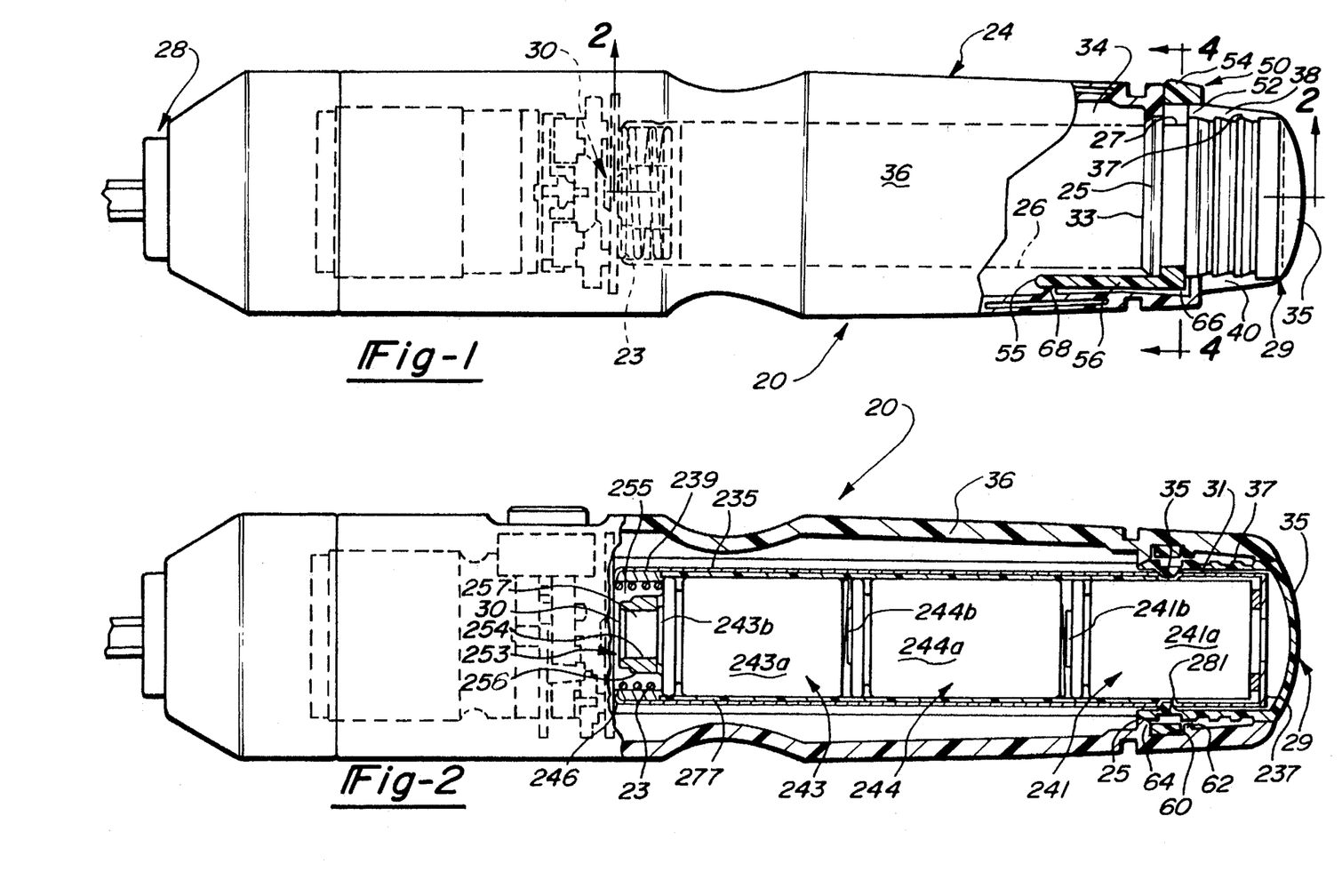
FIG. 1 is a side view, partially in cross section; of a cordless device in accordance with the present invention.
FIG. 2 is a cross sectional view of the cordless device of FIG. 1 along line 2—2 thereof.

As shown in FIGS. 1 and 2, in accordance with the present invention, a cordless device 20, herein exemplified as an in-line screw driver, comprises a housing 24 to receive a battery pack 26, a motor (not shown), an output spindle 28, a gear train (not shown) intermediate the motor and spindle, and a receptacle 30 to electrically connect battery pack 26 to the motor through a motor control circuit (not shown) including on and off and speed control switch 32. Housing 24 further includes a generally cylindrical cavity 34 and a handle portion 36 of the housing 24 to receive battery pack 26 in receptacle 30. Also, the housing 24 includes a pair of opposing housing openings 38 and 40 which enable removal of the battery pack 26 from the housing 24. Optionally, a spring 23 may be positioned in the housing cavity 34 to provide an ejection force to remove the battery pack from the housing upon removal of the retention force.

According to one aspect of the invention, the battery pack 26 is removably located in the cavity 34 and is electrically connectable to the receptacle 30 regardless of the angular orientation of the battery pack 26 about a longitudinal axis of symmetry of the pack 26 (this aspect of the invention is sometimes hereinafter referred to as the universal angular orientation feature). The pack 26 is thus easier to use and may be easily loaded in device 20 under adverse conditions such as in dim light or in cramped quarters.

Battery pack 26 is fully described in U.S. patent application Ser. No. 08/065,736 for "Battery Pack For Cordless Device", filed May 21, 1993, the specification and drawings of which are herein expressly incorporated by reference. Thus, a detailed description of the battery pack 26 will not be given and only those elements which are necessary for the description will be described.

Battery pack 26 comprises an elongated cylindrical tubular metal casing 235 having opposed rear and forward ends 237 and 239. A plurality of electrically connected mechanically disconnected cells 241, 243, 244 are disposed end to end in casing 235. For simplicity, pack 26 is illustrated in FIG. 2 with three cells 241, 243, 244. However, the present invention is equally applicable to packs including two or more cells. Each cell 241, 243, 244 has a cell can 241a, 243a, 244a for forming a first cell terminal and a button terminal 241b, 243b, 244b closing one end of the cell and forming a second cell terminal. As is conventional, the first or cell can terminal 241a, 243a, 244a is negative and the second or button terminal 241b, 243b, 244b is positive. The cells 241, 243, 244 are preferably nickel cadmium cells which are preferred for high discharge rate applications (5 to 30 amps) such as power tools and certain kitchen appliances. However, the present invention is also equally applicable to other rechargeable and primary cell couples such as nickel, metal hydride or primary alkaline cells.

The top 253 closes the casing forward end 239, is electrically connected to button terminal 243b and forms a second pack terminal 254. Top 253 is radially symmetrical about the casing axis and defines a cavity 255 in the casing forward end 239. A forwardly projecting nipple 257 formed on the top 253 is fully recessed within cavity 255 and terminates rearwardly to a forward edge of casing 235. Top 253 is electrically connected to and mechanically disconnected from forward cell 243 through engagement with button terminal 243b. As will be appreciated, first and second pack terminals 246, 254 and 255 have opposite polarities (preferably, negative and positive, positive, respectively), are coaxial with the casing axis and are located adjacent to the casing forward end 239 and, for those reasons, pack 26 is easily connectable in the cordless device 20 with receptacle 30 regardless of the angular orientation of the pack 26 about the pack axis. To electrically insulate each cell 241, 243, 244 from casing 235, the cells 241, 243, 244 are enclosed with an electrically insulated sleeve 277.

Figures 15, 17, 18:
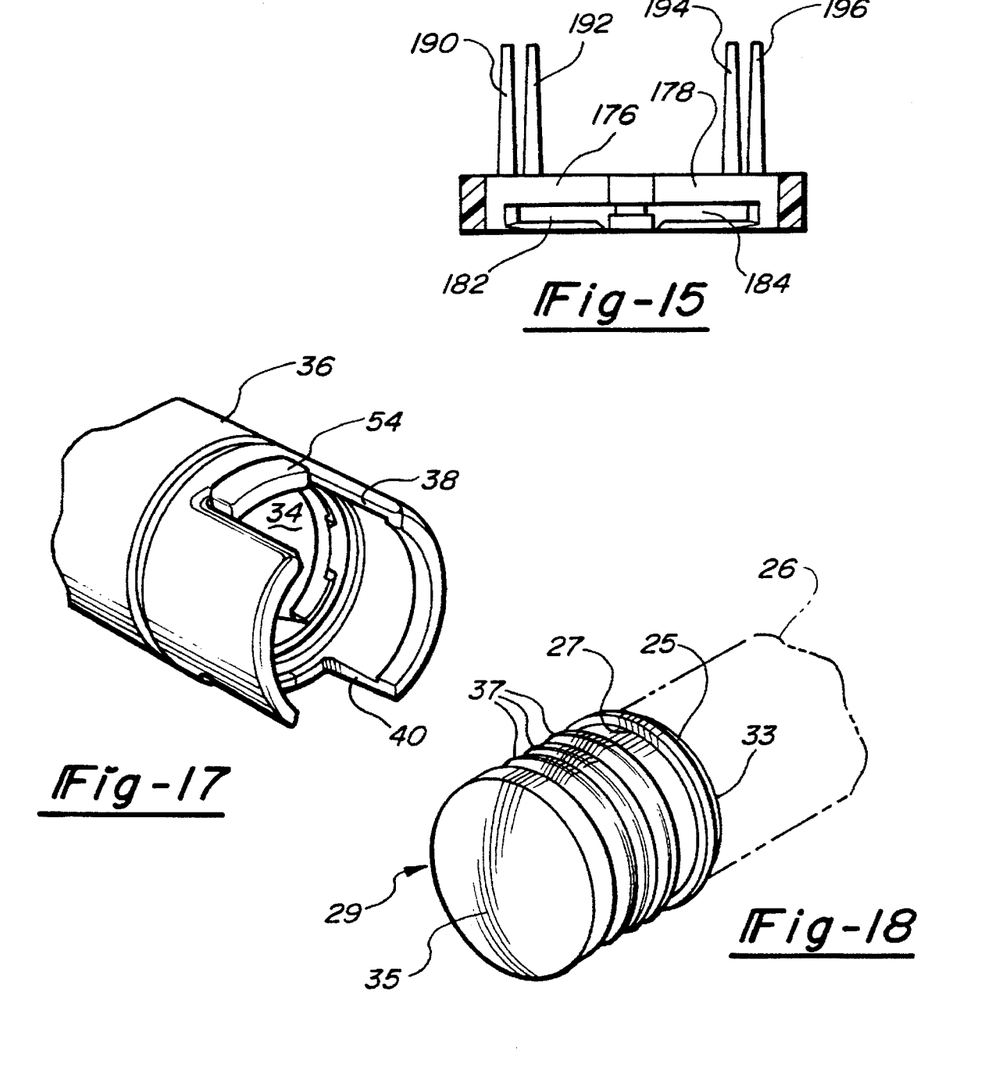
FIG. 15 is a cross sectional view of FIG. 14 along line 15—15 thereof.
FIG. 17 is a partial perspective view of the cordless device of FIG. 1.
FIG. 18 is a perspective view of a cap in accordance with the present invention.

The cap 29 has a cylindrical wall 31 with an exterior surface and an interior diameter to fit over the metal housing of the battery pack 26. The cap 29 is secured to the pack 26. The cylindrical wall 31 has an open end 33 and a closed dome shaped end 35, however, the closed end could likewise be open. The dome end 35 acts as a shock absorber in the event the battery is dropped on a surface. Adjacent the open end 33 is an angled peripheral surface 25 on the external surface. The angle surface 25 acts as a cam to enable passage of the cap 29. A latch keeper groove 27 is formed in the external surface of the cylindrical wall 31 to provide an engaging recess for the retention latch 50, 140. Gripping members 37 are peripherally formed on the exterior surface of the cylindrical wall to aid in grasping of the cap 29 to remove the pack 26 from the housing 24. The cap includes a bead 39 on its interior surface to secure it with a recess 281 in the pack casing 235.

Figures 3, 4, 5, 6, 7:
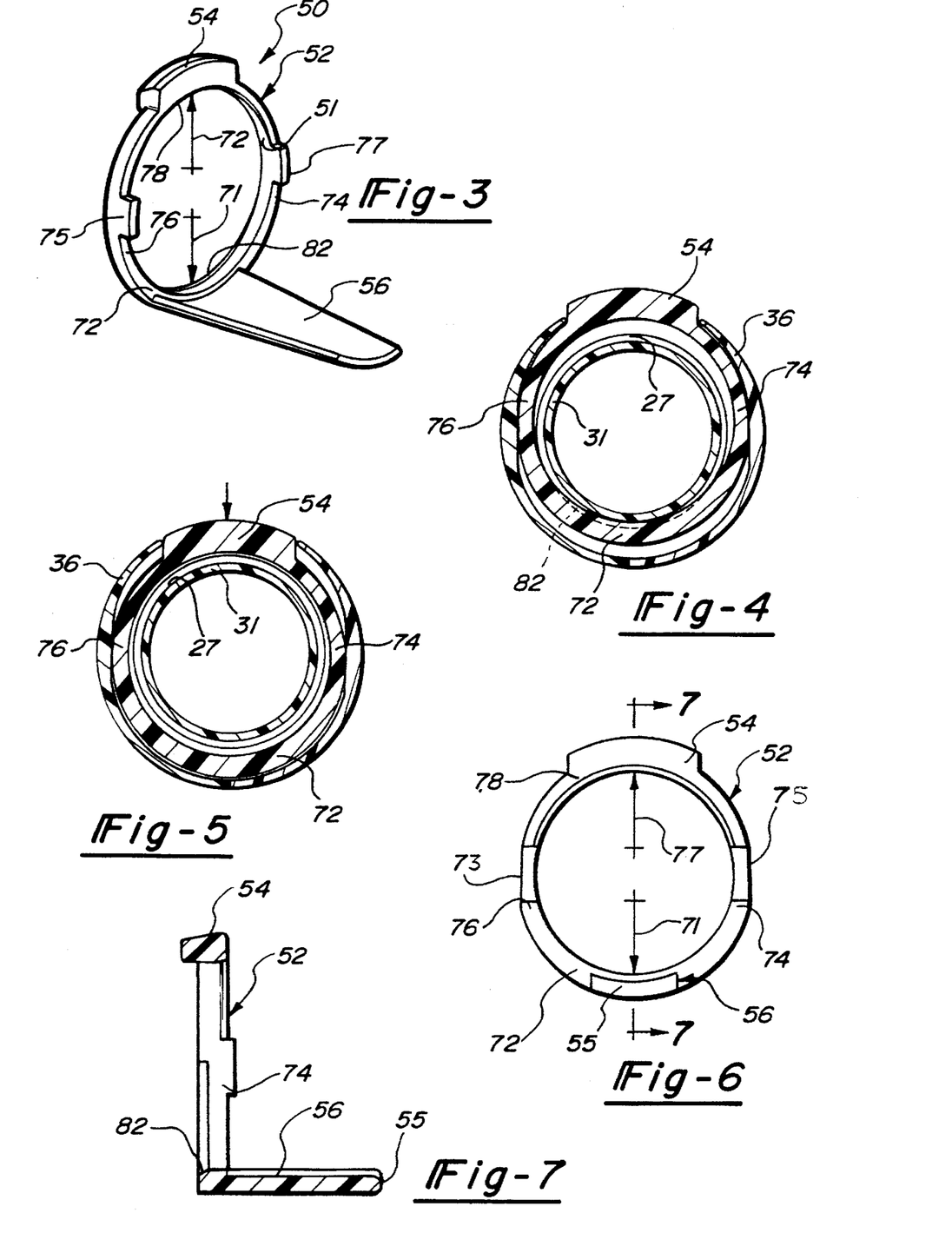
FIG. 3 is a perspective view of a retaining latch in accordance with the present invention.
FIG. 4 is a cross sectional view of FIG. 1 along line 4—4 thereof in an engaged position.
FIG. 5 is a view like FIG. 4, with the latching ring in a disengaged position.
FIG. 6 is a rear plan view of the latch of FIG. 3.
FIG. 7 is a cross sectional view of FIG. 6 along line 7—7 thereof.

The latch 50 is positioned transversely to the housing 24 to retain the battery 26 within the cavity 34. The latch 50 couples with a latch keeper groove 27 formed in the battery pack cap 29. The latch 50 includes a latch ring 52, a push button 54 and a spring means 56 coupled to latch ring 52. In this embodiment, spring means 56 is preferably constituted by forwardly extending cantilevered spring arm 56 and is for biasing latch ring 52 between a normally engaged position (FIG. 4) and a release position (FIG. 5). Alternatively, spring means 56 may be constituted by a torsion spring (not shown) coupled to one side of ring 52 or may be constituted by a first forwardly extending cantilevered spring arm and a second rearwardly extending cantilevered spring arm. The use of forwardly and rearwardly extending arms would be desirable in devices that can accommodate a latch of greater length and would have the advantage that the mounting of latch ring 52 would be more stable and balanced. The ring 52 is positioned within the housing 24 in a groove 60 formed by a pair of radially inwardly extending walls 62, 64 in the housing 24 (FIG. 2). Also, the cantilevered spring arm 56 is located in a recess 66 in the housing 24. The distal end 55 of the spring arm 56 is supported on a housing projection 68 to locate the latch ring 52 in a normally engaged position. The spring constant of spring arm 56 may be easily varied by changing its shape and thickness. Also, the spring force of spring arm 56 may be easily varied by changing the height or location of projection 68. And thus, latch 50 may be easily adapted to the requirements of the embodiment shown in FIGS. 1–7 and other applications.

Turning to FIGS. 3 through 7, the latch 50 is shown. The latch ring 52 includes ring portions 72, 74, 76 and 78. The first ring portion 72 acts as the battery engaging portion which engages the latch keeper groove 27 formed in the battery pack cap 29. The spring arm 56 extends from this portion 72 of the ring 52. The ring portions 74 and 76 are transition portions and extend on each side of the continuous ring 52 and include reinforcement tabs. To guide movement of ring 52, each ring portion 74, 76 has a flat outer surface 75, 77 in sliding engagement with a respective inner flat web between sidewalls 62, 64. Fourth ring portion 78 opposes the first ring portion 72 and includes the unitarily formed push button 54. As can be seen in the figures, the ring 52 has an elliptical shape with a first radius 71 defining the arc of the first ring portion 72 with substantially parallel arcs or lines on the ring portions 74 and 76 and a second radius 77 defining the arc of the fourth ring portion 78. The radii 71, 77 of the first and fourth ring portions 72 and 78 are different such that the second 74, third 76 and fourth 78 ring portions do not engage the battery latch keeper groove 27 in an engaged or disengaged position. Also, this design aids in the movement of the latch ring 56 such that when the push button 54 is pushed radially of the housing 24, the ring 52 is moved laterally downward without bowing its annular portion and is disengaged by flexing spring arm 56 in the housing recess 66. Thus, ring 52 is located in the disengaged position shown in FIG. 5. The annular portion of the ring 52 is guided by and prevented from bowing by the web between side walls 62, 64 of the housing 24, as seen in FIG. 2. Further, flat surfaces 75, 77 aid in reducing friction and prevent rotation of ring 52 about the longitudinal axis of handle 36.

The engagement ring portion 72 includes an angled cam surface 82 which assists to enable the battery 26 to pass through the ring 52 as the battery cap 29 contacts the cam surface 82, assisting the battery 26 to slide through the latch opening 51.

The latch 50 is ordinarily formed from a polymeric material such as acetel forming the latch 50 as a unitary one piece device. However, the latch 50 may be manufactured from several different parts pieced together to form a desired latch member. Also, the latch could be made of a metallic material or a metallic material coated with a polymeric material.

The distal end 55 of the arm 56 is supported on the housing projection 68 to locate the latch ring 52 in a normally engaged position (FIGS. 1, 2 and 4). Here, the first ring portion 72 of the ring 52 is engaged on or latched in the cap groove 27. When the push button 54 is pushed radially inward of the housing, ring 52 is moved laterally downward (without bowing its annular position) and is disengaged by flexing spring arm 56 into the recess 66. Thereby, ring 52 is located in the disengaged position shown in FIG. 6. The annular portion of the ring 52 is prevented from bowing by the radially inward housing web between side walls 62, 64 (FIG. 2).

To insert the battery pack 26 into the housing 24, the battery pack 26 is inserted into the housing 24 in any angular orientation and is freely slidable in the housing cavity 34 until the first latch ring portion 72 engages the forward tapered rim 25 of the battery cap 29. The rim 25 functions as a camming surface with the camming surface 82 of the first ring portion 72 and bends arm 56 outwardly as battery pack 26 is manually forced into the cavity 34. In this manner, ring 52 slides over rim 25 and is biased resiliently inward into the cap groove 27 by spring arm 56 to assume the engaged position shown in FIGS. 1, 2 and 4. To disengage battery, pack 26 the release button 54 is pushed radially inwardly, normally by the user's thumb, to flex spring arm 56 into the housing recess 66. Thereafter, battery pack 26 can be pulled axially outwardly from the cavity 34 by the index finger on the same hand of the user by gripping or grasping the gripping members 37 of the cap 29 through one of the opposed housing openings 38, 40.

Figures 8, 16:
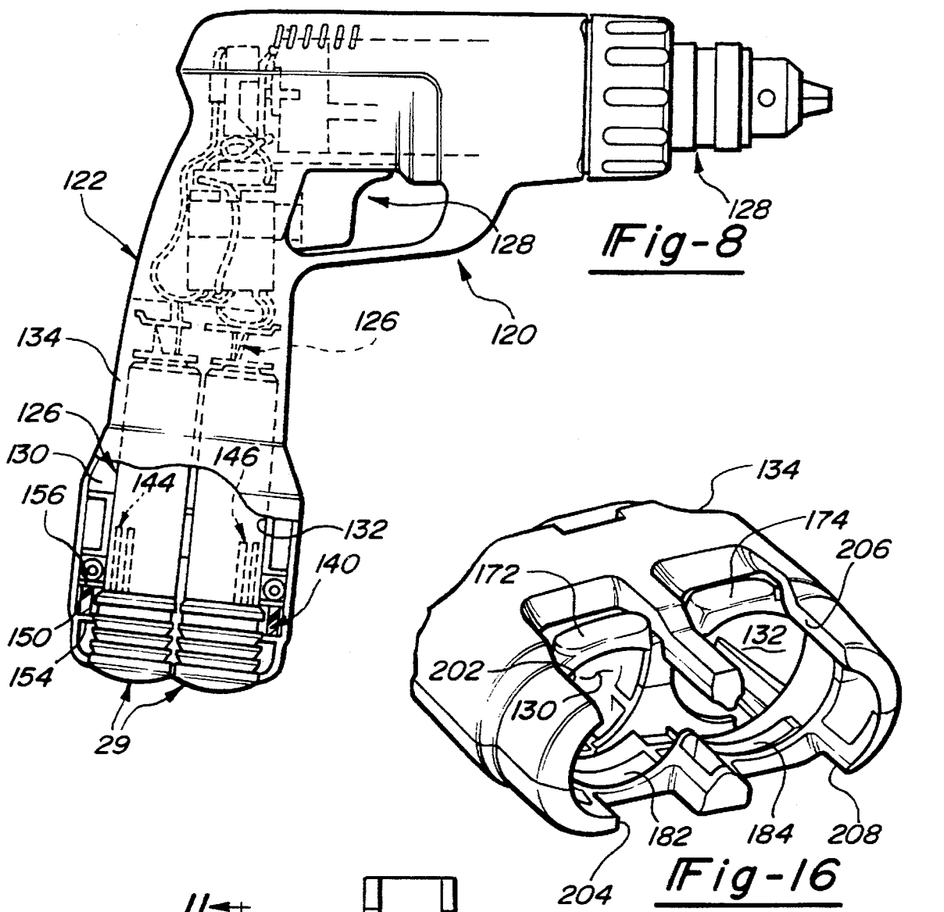
FIG. 8 is a side view partially in section of a second embodiment of a cordless device in accordance with the present invention.
FIG. 16 is a partial perspective view of the cordless device of FIG. 8.
Figure 9:
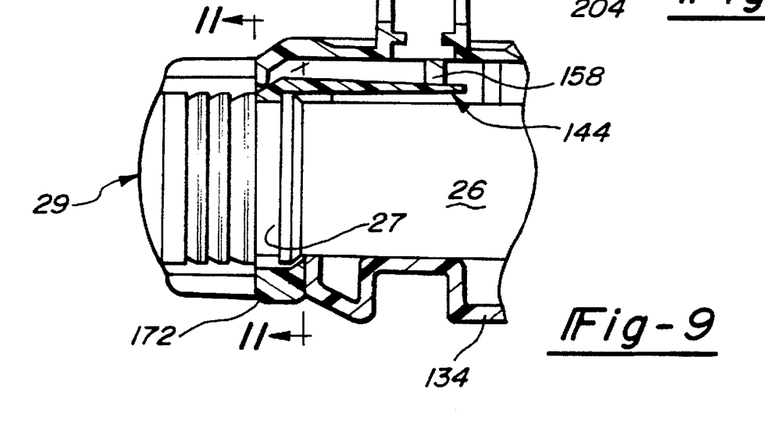
FIG. 9 is a side plan view, partially in section, of the cordless device of FIG. 8.

In accordance with another feature of the present invention, cordless device 120, herein exemplified as a drill, comprises a housing 122 for receiving battery packs 26, a motor, not shown, an outer spindle 124, a gear train (not shown) intermediate the motor and spindle 124, and a receptacle 126 for electrically connecting the battery packs 26 to the motor through a motor control circuit (not shown), including on/off and speed control switch 128. Springs (not shown) like the one previously described could be used to provide an ejection force. Housing 122 further includes cylindrical cavities 130 and 132 in a handle portion 134 of the housing 122 to receive battery packs 26 in receptacle 128. The battery packs 26 are the same as those previously defined with the invention being directed to a retention latch 140 positioned within the housing handle 134.

Figures 11, 12, 13:
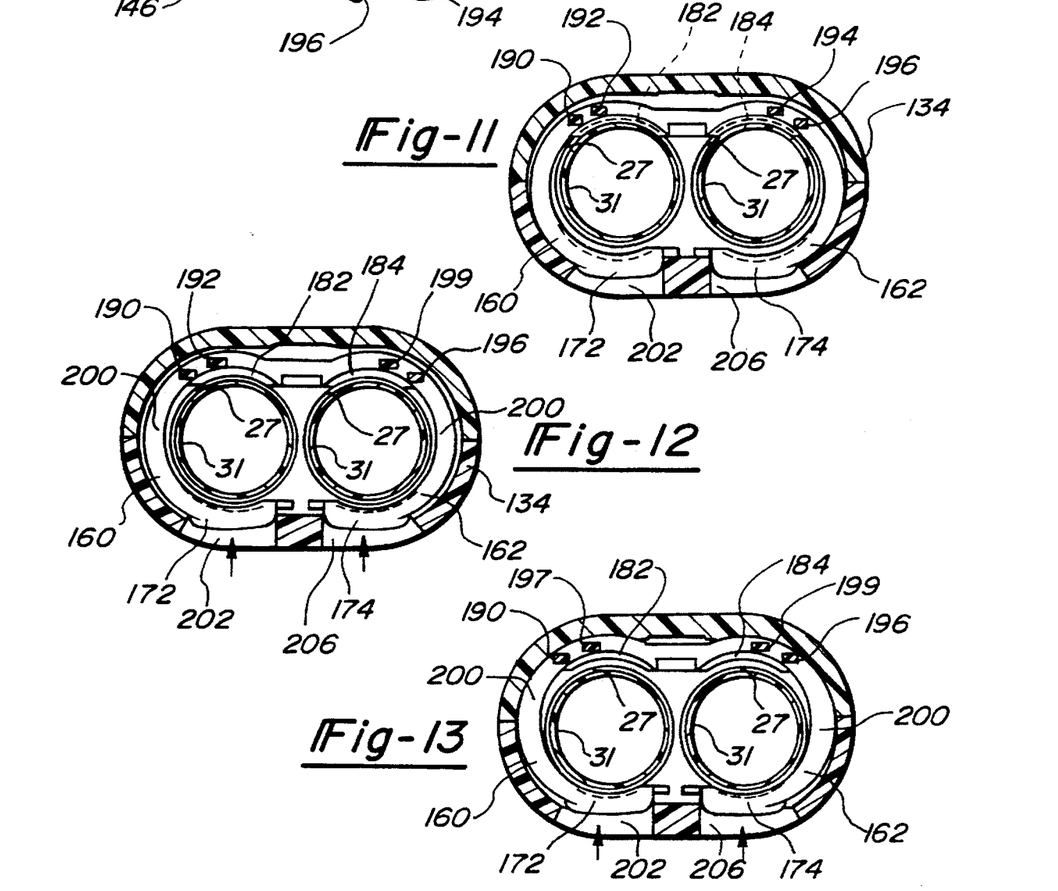
FIG. 11 is a cross sectional view of FIG. 8 along line 11—11, with the latch in an engaged position.
FIG. 12 is a view like that of FIG. 11 in a transition position.
FIG. 13 is a view like FIGS. 11 and 12 with the latch in a disengaged position.
Figure 14:
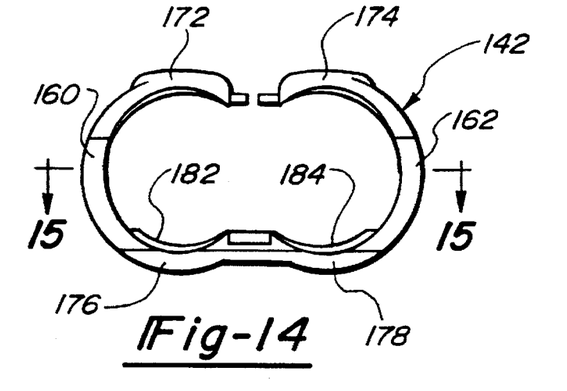
FIG. 14 is a front plan view of the latch in accordance with the present invention.

The latch 140 comprises a latch double ring 142 mounted in the drill handle 134 and latch keeper grooves 27 formed in the battery pack caps 29. The double ring 142 is located transversely of the handle 134 and is coupled to a spring means 144, 146 for biasing latch ring 142 between a normally engaged position (FIG. 11) and a release position (FIG. 12). In this embodiment, spring means 144, 146 is preferably constituted by a pair of forked cantilevered spring arms 144, 146. As in the case of the embodiment shown in FIGS. 1–7, the spring means may also be constituted by a torsion spring or by forwardly and rearwardly extending spring arms. The ring 142 is seated in a transverse channel 150 defined by a pair of radially extending parallel spaced walls 154 and 156 and is laterally slidable in a plane perpendicular to the battery pack axes. The spring arms 144 and 146 are supported on projections 158 on the interior of the handle 134 to locate the latch ring in a normally engaged position, as shown in FIGS. 8, 9 and 11.

Figure 10:
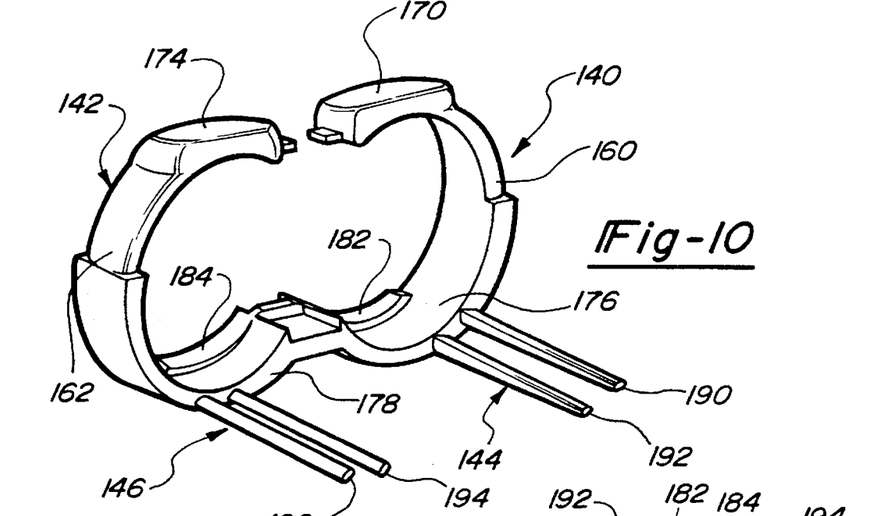
FIG. 10 is a perspective view of a second embodiment of a retaining latch ring in accordance with the present invention.

As shown in the figures, the double ring 142 has an overall open figure eight configuration which is open inside the annular regions. Each ring 160, 162 is C shaped, being connected at one end 164, 166 and being free at the other 168, 170. The free ends 168, 170 of the rings 160, 162 include an integrally or unitarily formed push button 172, 174 which enables movement of the latch rings 160, 162.

Opposing the push buttons 172, 174 are engagement portions 176 and 178 of the C shaped rings 160, 162. The engagement portions 176 and 178 include integrally or unitarily formed arcuate flanges 182 and 184 that are latched, respectively, in the battery pack grooves 27. The spring arms 144, 146 extend from the engaging portion 176, 178 of the C shaped rings 160, 162. Thus, the arms 144, 146 also oppose the push button members 172, 174. Further, preferably each spring arm 144, 146 includes a pair of arms 190, 192, 194, 196. As mentioned above, the pair of arms 190, 192, 194, 196 are supported on projections 158 to locate the latch ring 142 in a normally engaged position as shown in FIG. 11.

As seen in FIGS. 11 and 12, the pair of integrally formed arcuate flanges 182, 184 are latched, respectively, in cap grooves 27. The latch 140 is designed such that the battery packs 26 can be selectively removed one at a time. To disengage one of the packs 26, the push button 172 is pushed laterally towards the battery pack 26 by the user's thumb to disengage the flange 182 from the cap groove 27 by primarily resiliently bending the spring arms 190, 192. The annular portions of the ring 142 are designed such that the bending of the annular portions 160 is slight when flexing the spring arms 190, 192. Also, the ring 160 may pivot slightly about a point 200 when disengaging the flange 182 from the groove 27. Thus, the battery 26 may be removed from the cavity 130 by gripping or grasping with the index finger of the same hand the gripping member 37 of the cap 29 through one of the opposed housing openings 202, 204. Regardless, the other flange 184 remains engaged in the groove 27 when the push button 172 is pushed to the disengagement position. The other battery pack 26 is removable from the handle 134 by pushing the other push button 174 to disengage the flange 184 from the groove 27 in an analogous manner. Likewise, the cap 29 would be gripped with an index finger through one of the opposing housing openings 206, 208.

To insert the battery packs 26 in the handle 134, the pack 26 is inserted into the handle 134 in any angular orientation and is freely slidable in the handle cavities 130, 132 until the flange 182, 184 engages the forwardly tapered rim 25 of the cap 29. The cap rim 25 functions as a camming surface and bends the spring arm 190, 192, 194, 196 outwardly as the battery pack 26 is manually forced into the cavity 130, 132. In this manner, flange 182, 184 of the ring 160, 162 slides over the cap rim 25 and is resiliently biased inward into the cap groove 27 by the spring arm 190, 192, 194, 196 and somewhat by the other spring arm 194, 196, 190, 192 to assume the engaged positioned shown in FIG. 11. The other battery pack 26 may be inserted into the cavity 132, 130 in the handle 134 in an analogous manner.

As mentioned above, the latch 140 can be manufactured from a plethora of materials, including polymeric materials such as nylon, metallic materials or metallic coated materials. Also, the latch 140 may be a unitary one piece device or it may be formed by several independent members.

Referring to FIGS. 19 through 26, additional embodiments are shown. Like elements are identified with the same reference numerals.

Figure 19:
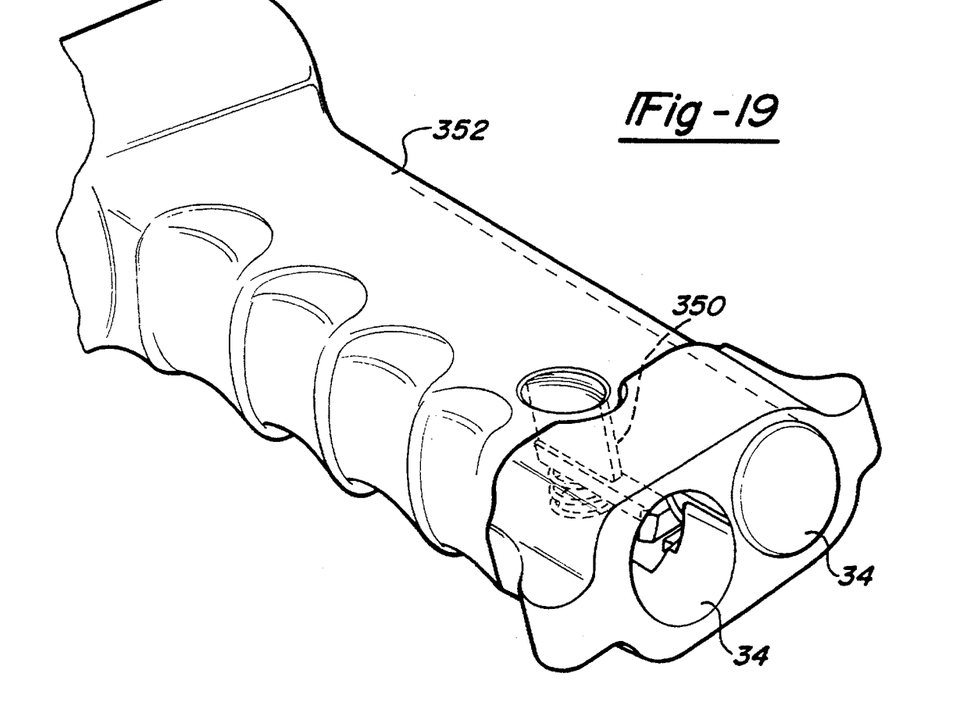
FIG. 19 is a perspective view of an additional embodiment of the present invention.
Figure 20:
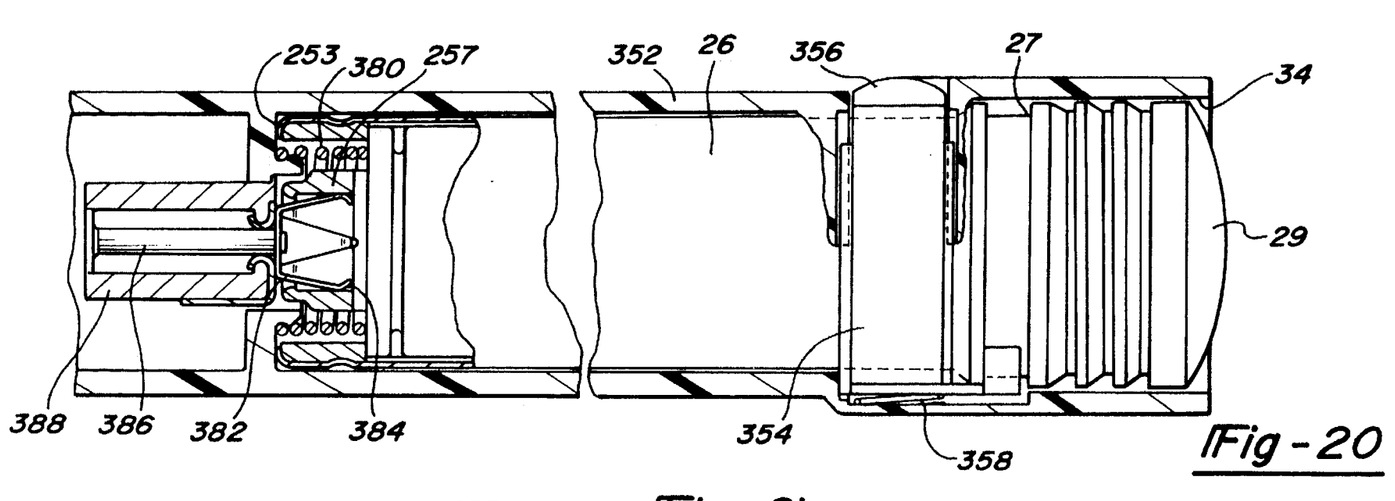
FIG. 20 is a cross section view through the embodiment of FIG. 19 along line 20—20 thereof.

The latch 350 is positioned transversely to the housing 352 to retain the battery 26 within the cavity 34. The housing 352 is similar to that previously described, however the differences will be described in further detail. The latch 350 couples with the latch keeper groove 27 formed in the battery cap 29. The latch 350 includes a retaining member 354, a push button 356, and a biasing spring 358.

Figure 22:
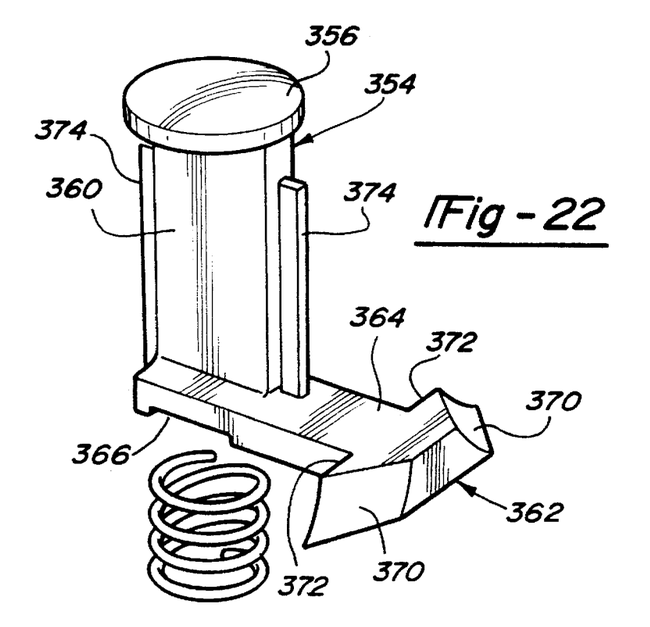
FIG. 22 is a perspective view of a latch in accordance with the present invention.
Figure 23:
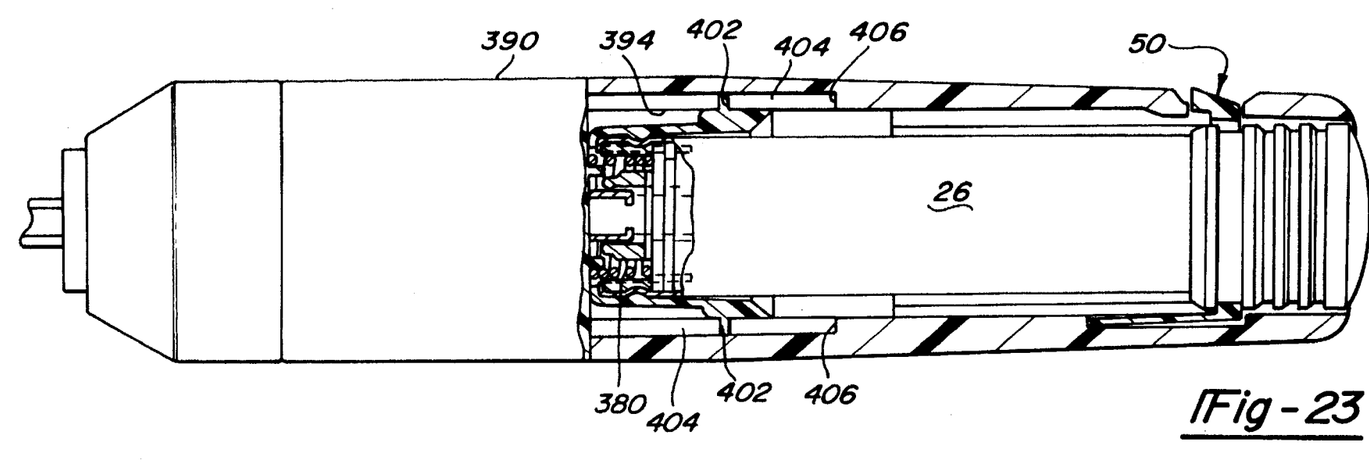
FIG. 23 is a cross section view of another embodiment of the present invention.

The retaining member 354 has an overall L-shape when viewed in side elevation with the push button 356 at the free end of the vertical leg 360 and a cam element 362 positioned at the free end of the horizontal leg 364. The horizontal leg 364 includes a cut-out 366 which retains the spring 358 in contact with the retaining member 354.

The cam element 362 has an overall trapezoidal shape when viewed in front elevation. A pair of cam surfaces 370 are inclined and enable passage of the battery 26 past the cam element 362 into the cavity 34. Likewise, a pair of retaining faces 372 oppose the cam faces 370 which retain and block the battery 26 in the keeper groove 27 of the battery cap 29.

Figure 21:
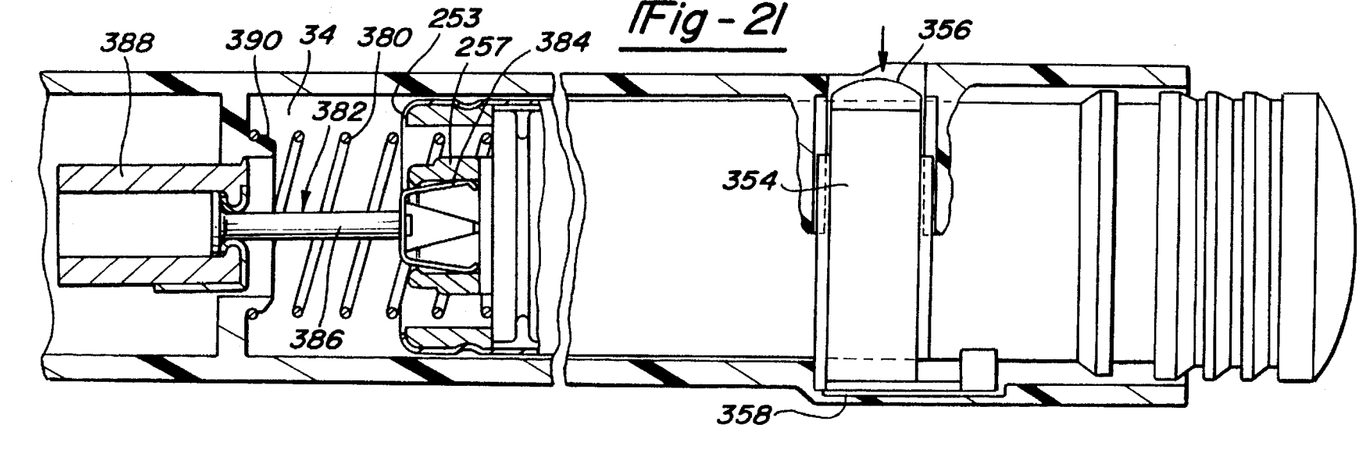
FIG. 21 is a view like FIG. 20 with the battery in a held ejection position.

As can be seen in FIGS. 20 and 21, as the push button 356 is activated, which in turn compresses the spring 358, the retaining face 372 moves transversely with respect to the keeper groove 27 and moves below the battery cap 29 whereupon the battery may be removed from the cavity 34. The spring 358 is generally a helical spring, however any type of spring may be utilized to perform the biasing function. Also, as can be seen, other than the spring 358, the latch is formed as a one-piece unit usually injection molded from a desired plastic material or the like.

Also, the vertical leg 360 includes a pair of elongated tabs 374 on its longitudinal side edges which retain the latch 350 within grooves 376 within the housing 352. Thus, the latch 350 is enabled to easily move up and down as it is activated and pushed back in position by the biasing spring 358.

Turning to the housing 352, as can be seen, the housing includes a spring 380 and a electrical receptacle 382. The spring 380 is a helical spring which is used to bias the battery 26 out of the cavity upon activation of the latch 350. Upon pressing of the push button 356, the spring 380 biases the battery out of the housing 352.

The electrical receptacle 382 includes at least one, preferably a plurality of fingers 384 to retain the battery onto the electrical receptacle 382. The fingers 384 are compressed together upon receiving the projecting nipple 257 on the top 253 of the battery 26. When the nipple 257 contacts the fingers 384, the fingers are compressed and exert a retaining gripping force onto the projecting nipple 257. The gripping force of the fingers 384 is larger, in magnitude, than the spring force so that upon activation of the latch 350 the spring will eject the battery 26 from the cavity while the electrical receptacle 382 retains the battery within the cavity so that a portion of the battery is extended from the cavity 34 as seen in FIG. 20. Thus, the user can readily grab hold of the battery cap and exert a pulling force on the battery cap which overcomes the force of the retaining fingers 384 which, in turn, enables removal of the battery from the cavity 34.

Also, the electrical receptacle 382 includes a cylindrical post 386. The cylindrical post 386 axially slides in an electrical connector 388 to enable electrical receptacle 382 to axially move in the cavity 34 which, in turn, enables the battery to be moved partially out of the housing 352. The electrical receptacle 382 is ordinarily of an electrical connecting material so that proper electrical connection is made between the battery and motor of the device. Also, as shown, the spring is positioned circumferentially about the cylindrical post 386 connected to a housing seat 390 so that the spring pushes on the top of the battery 352. Likewise, the fingers could be reverted forming a cavity between the post and fingers so that a spring could be positioned within the cavity so that the spring could bias the receptacle instead of the battery.

The housing 352 includes two cavities 34 for holding two batteries. The above discussion of the cavity and receptacle apply to both cavities.

Turning to FIGS. 23 through 26, an additional embodiment is shown. An additional housing 390 is illustrated with a retainer latch which is the same as latch 50 described above. The housing 390 includes a biasing spring 392 to eject the battery 26 from the housing 390 as previously explained. Also, the housing includes a holding member 394 which maintains the battery 26 in the housing against the force of the spring 392.

Figure 24:
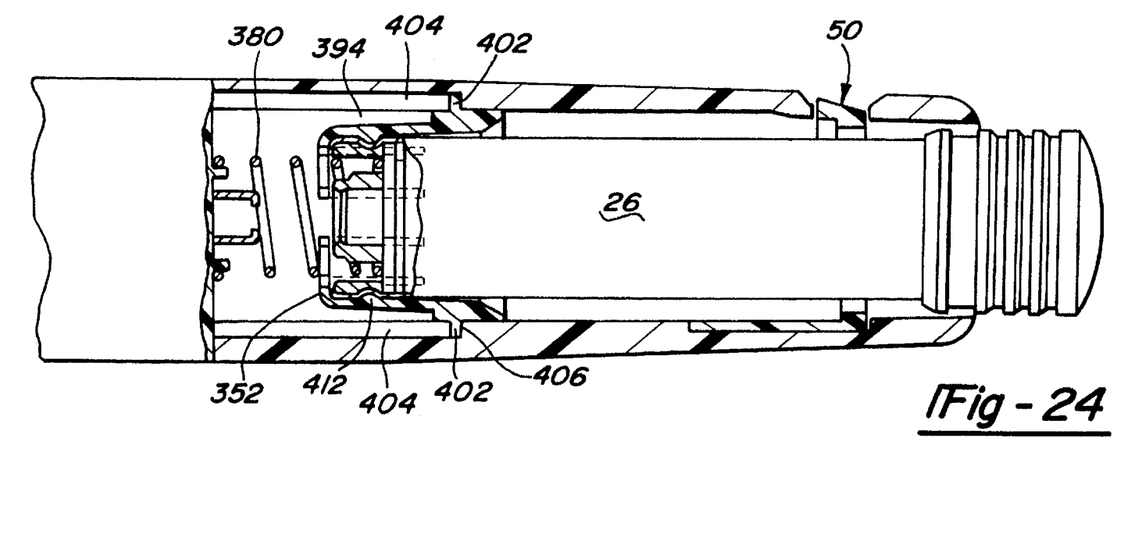
FIG. 24 is a cross section view like FIG. 23 with the battery in a held ejection position.
Figure 25:
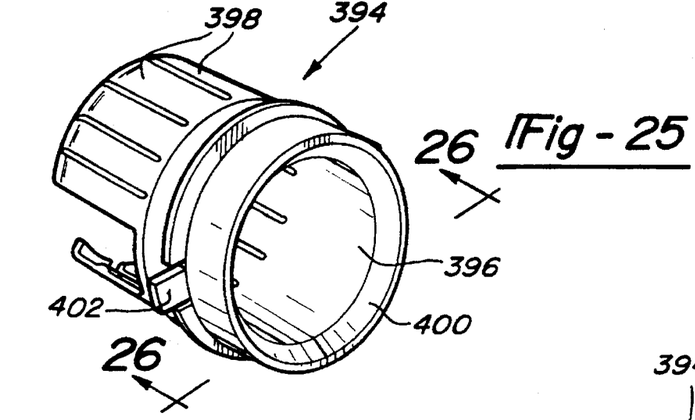
FIG. 25 is a perspective view of a holding device in accordance with the present invention.
Figure 26:
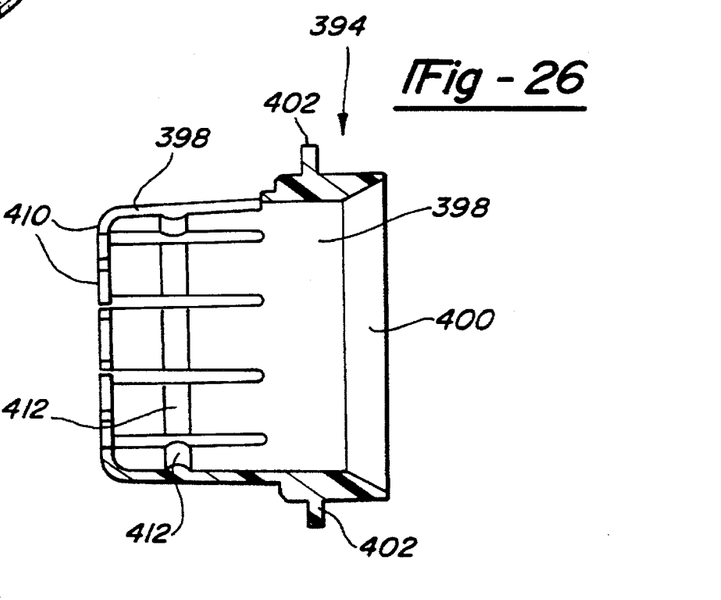
FIG. 26 is a cross section view of the holding device of FIG. 25.

The holding member 394 has an overall annular shape with a ring portion 396 and at least one, preferably a plurality of extending fingers 398. The ring 396 has an annular cam surface 400 which enables the battery 26 to pass into the holding member 394. Also, the ring 396 includes a pair of tabs 402 which enable the holding member 394 to axially move in slots 404 of the housing 390. The tabs 402 abut against blocking members 406 in the housing 390 which stop the axial movement of the holding member 394 against the spring force. Thus, the tabs 402 stop the axial movement so that the battery 26 only extends a desired distance out of the housing 390 as illustrated in FIG. 24.

The fingers 398 extend from the ring 396 and have a curved end 410. Also, the fingers include an interior extending detent 412. As the battery 26 passes into the holding member 394, the top 352 of the battery casing abuts the curved ends 410 of the fingers and the detent 412 snaps into the radial groove on the battery top 253.

The spring 392 exerts a force on the curved ends 410 of the holding member which in turn move the holding member 394 axially in the housing. The tabs 402 abut the stops 406 whereupon the battery extends a desired distance out of the cavity. Thus, the user can grab the cap 29 of the battery, pull on the battery overcoming the force of the detents 412, pushing the fingers 398 outward and enabling the battery to be removed from the cavity 34.

Figure 27:
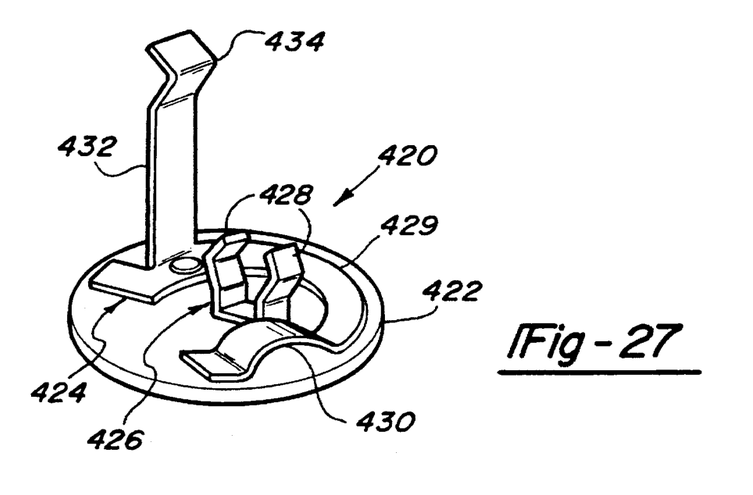
FIG. 27 is a perspective view of another embodiment of a holding device in accordance with the present invention.
Figure 28:
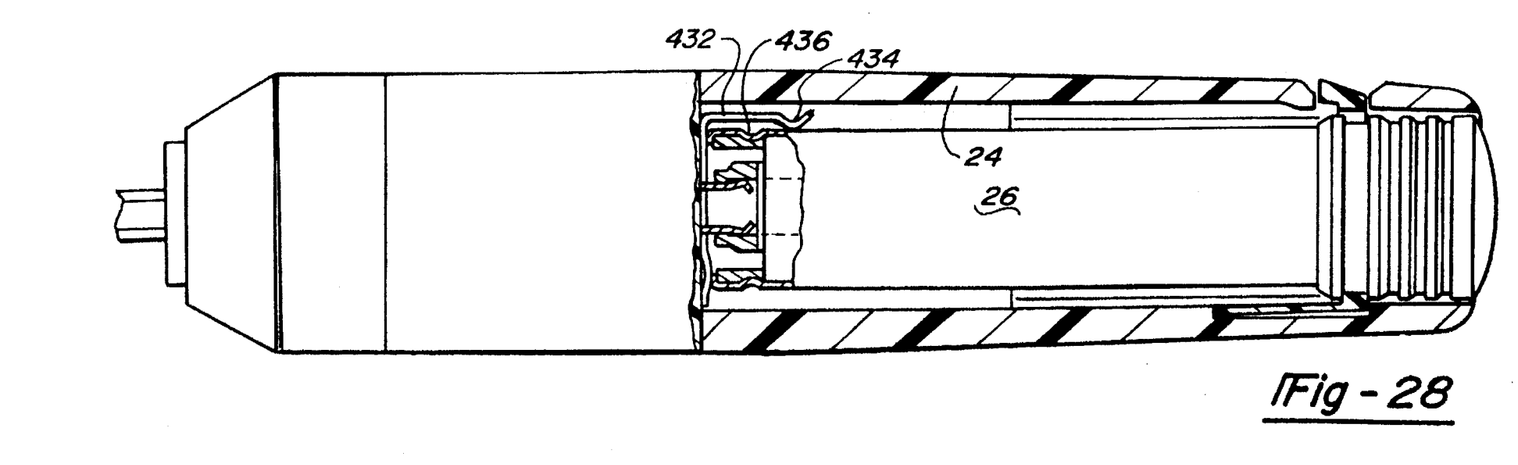
FIG. 28 is a cross section view of the holding device of FIG. 27 in a latched position.
Figure 29:
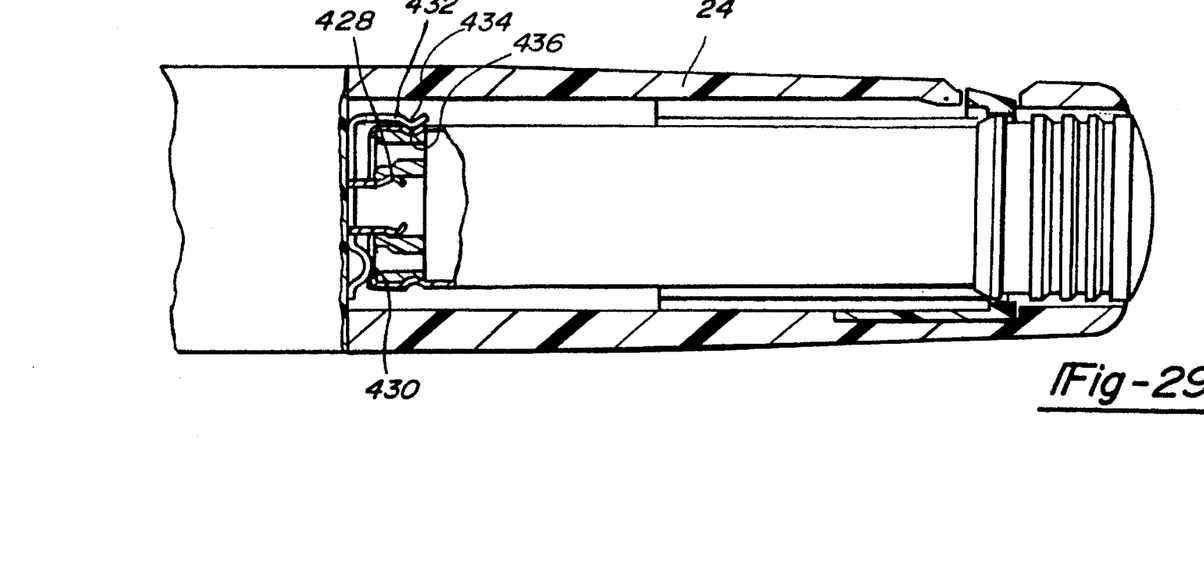
FIG. 29 is a cross section view like FIG. 28 with the battery in the held ejected position.

Turning to FIGS. 27 through 29, an additional embodiment is shown. A terminal assembly 420 is illustrated including an insulating support 422, a negative terminal 424 and a positive terminal 426. The negative and positive terminals 424, 426 are rivoted to the insulative support board 422. The positive terminal 426 includes a pair of extending fingers 428 which engage the battery pack terminal, thus electrically connecting the battery to the motor.

The negative terminal 424 includes an arcuate base 429 terminating in a spring portion 430 for ejecting the battery pack 26. Also, the negative terminal includes a cantilevered arm 432 which serves as an electrical connection to the battery pack sidewall. Also, the cantilever arm 432 includes a detent 434 which engages the annular recess in the battery pack 26.

Turning to FIG. 28, the battery pack is illustrated in a latched position. In this position, the spring arm 430 is flattened and the cantilevered arm detent 434 is disengaged from the annular recess 436 in the battery pack 26. As shown, the positive terminal 426 is engaged with the battery pack terminal.

FIG. 29 illustrates the battery pack in an unlatched position. In the unlatched position, the spring portion 430 returns to its relaxed position which, in turn, ejects the battery pack 26 from the housing 24. As the battery pack 26 is ejected from the housing, the cantilevered arm detent 434 engages the annular recess in the battery 26 to retain the battery pack 26 in the housing. As can be seen, a portion of the battery pack 26 extends from the housing 24 so that the user may readily grab the battery and pull it from the housing which overcomes the retention force of the cantilevered arm 432 to enable the battery to be pulled from the housing.

By eliminating retention latch from the battery itself and positioning the latch within the housing, the batteries may be smaller and are able to nest with one another in a group in close proximity to one another. Also, the latch is more durable when enclosed in the housing, prohibiting easy break off like that which occurs when the latch is on the battery. Other advantages will be apparent to those skilled in the art.

It will be recognized that although latches 50, 140 have been described as preferably generally annular or circular, other configurations may be used consistent with the geometry of the device in which the latch is used. For example, rectangular and octagonal configurations may be used. Such configurations may also be open to form a generally C-shaped configuration, if desired.

It will be apparent to those skilled in the art that various modifications and variations may be made in the cordless device and latch of the present invention without departing from the scope or the spirit of the present invention. Thus, it is intended that the present invention cover these modifications and variations provided they come within the scope of the appended claims and their equivalents.

What is claimed is:

1. A retention latch adapted to be positioned within a device for retaining a battery, said retention latch comprising:

an overall L-shaped retaining member adapted for engaging with the battery;

a release member integral with said retaining member, said release member adapted to be activated to move said retaining member to a release position to enable the battery to be removed from the device; and biasing means for positioning said retaining member within said device and for returning said retaining member to a normally engaged position upon deactivation of said release member, said biasing means coupled with said retaining member.

2. The retention latch according to claim 1, wherein said release member coupled with the vertical leg of the L.

3. The retention latch according to claim 2, wherein said biasing means coupled with the horizontal leg of the L and positioned adjacent the vertical leg.

4. The retention latch according to claim 2, wherein a cam element is positioned at an end of the horizontal leg of the L, said cam element adapted for engaging the battery.

5. The retention latch according to claim 4, wherein said cam element includes a cam face which enables the battery to pass by the retention device.

6. The retention latch according to claim 5, wherein said cam element includes a retaining face opposing said cam face, said retaining face adapted for engaging the battery to retain the battery in the device.

7. The retention latch according to claim 3, wherein said horizontal leg includes a cut-out for receiving said biasing means.

8. The retention latch according to claim 1, wherein said biasing means being a helical spring.

9. A cordless device comprising:

a cavity;

a receptacle in the cavity;

a battery pack removably located in the cavity, said battery pack including means for electrically coupling with said receptacle; and a latch including an overall L-shaped retaining member adapted for engaging with the battery, a release member coupled with said retaining member, said release member adapted to be activated to move said retaining member to a release position to enable the battery to be removed from the device, and biasing means for positioning said retaining member within said device and for returning said retaining member to a normally engaging position upon deactivation of said release member, said biasing means coupled with said retaining member.

10. The cordless device according to claim 9, wherein said release member coupled with the vertical leg of the L.

11. The cordless device according to claim 10, wherein said biasing means coupled with the horizontal leg of the L and positioned adjacent the vertical leg.

12. The cordless device according to claim 10, wherein a cam element is positioned at an end of the horizontal leg of the L, said cam element adapted for engaging the battery.

13. The cordless device according to claim 12, wherein said cam element includes a cam face which enables the battery to pass by the retaining member.

14. The cordless device according to claim 13, wherein said cam element includes a retaining face opposing said cam face, said retaining face adapted for engaging the battery to retain the battery in the device.

15. The cordless device according to claim 11, wherein said horizontal leg includes a cut-out for receiving said biasing means.

16. The cordless device according to claim 9, wherein said biasing means being a helical spring.

17. A cordless device comprising:

a cavity;

an electrical receptacle in the cavity;

a battery pack removably located in the cavity, said battery pack including means for electrically coupling with said electrical receptacle;

a biasing means in said cavity for ejecting said battery pack from said cavity;

means for holding said battery pack in said cavity against an ejecting force of said biasing means, said holding means positioned in said cavity; and a latch for retaining said battery pack in said cavity such that upon release of said latch, said battery pack being partially ejected from said cavity by the ejecting force from said biasing means and is held in said cavity against the ejecting force by said holding means.

18. The cordless device according to claim 17, wherein said holding means including an annular member with at least one retention finger for engaging and retaining said battery pack.

19. The cordless device according to claim 18, wherein further including a plurality of circumferentially spaced fingers for engaging and retaining said battery pack.

20. The cordless device according to claim 17, wherein said holding means is axially slidable in said cavity.

21. The cordless device according to claim 17, wherein said annular member includes a cam surface for enabling said battery pack to pass by said annular member.

22. The cordless device according to claim 18, wherein said finger includes a detent for coupling with said battery pack.

23. The cordless device according to claim 17, wherein said holding means coupled with said receptacle.

24. The cordless device according to claim 23, wherein said holding means including a member for removably coupling with said battery pack such that said member retains said battery pack in the cavity against said ejecting force.

25. The cordless device according to claim 23, wherein said member is axially movable in said cavity.

26. The cordless device according to claim 24, wherein said member includes a plurality of spaced fingers for coupling with said battery electronically coupling means.

27. The cordless device according to claim 9, wherein said battery pack includes a cap having a cylindrical wall and an annular groove in the cylindrical wall adapted for receiving said retaining member of said latch for retaining the pack in the cordless device.

28. The cordless device according to claim 17, wherein said holding means is unitarily formed with said biasing means.

29. The cordless device according to claim 28, wherein said holding means further includes an arm in said cavity extending from said housing, said arm adapted to engage an annular recess in said battery pack to retain said battery pack in the cavity in an unlatched condition.

30. The cordless device according to claim 29, wherein said holding means is coupled with said receptacle.

* * * * *